Oct. 30, 1951     P. S. KNOX JR., ET AL     2,573,342
SELF-LOADING VEHICLE
Filed Feb. 16, 1946     6 Sheets-Sheet 5
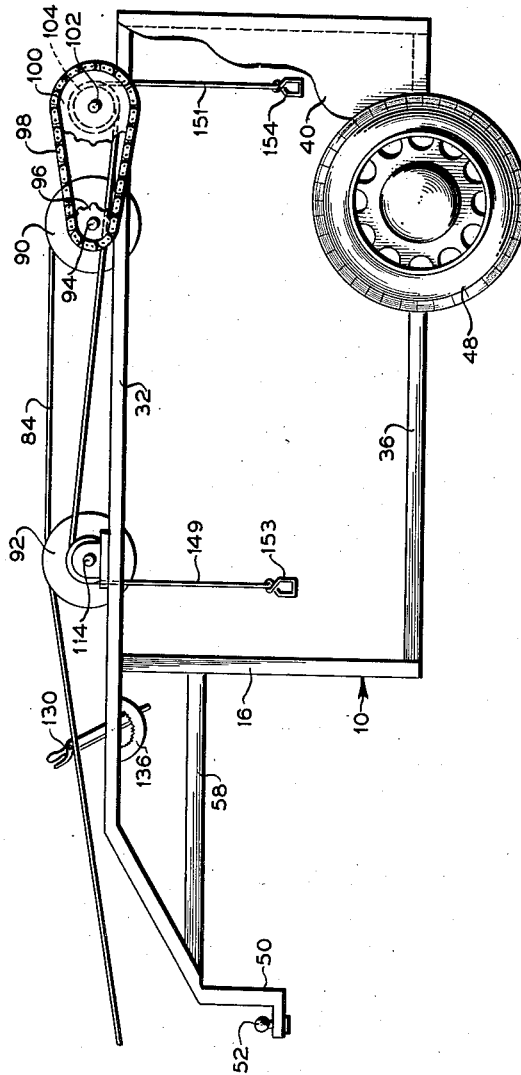
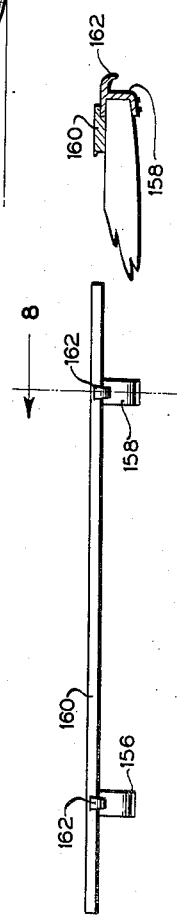
INVENTORS
PETER S. KNOX, JR.
WILLIAM I. STRAUSS
BY
ATTORNEY

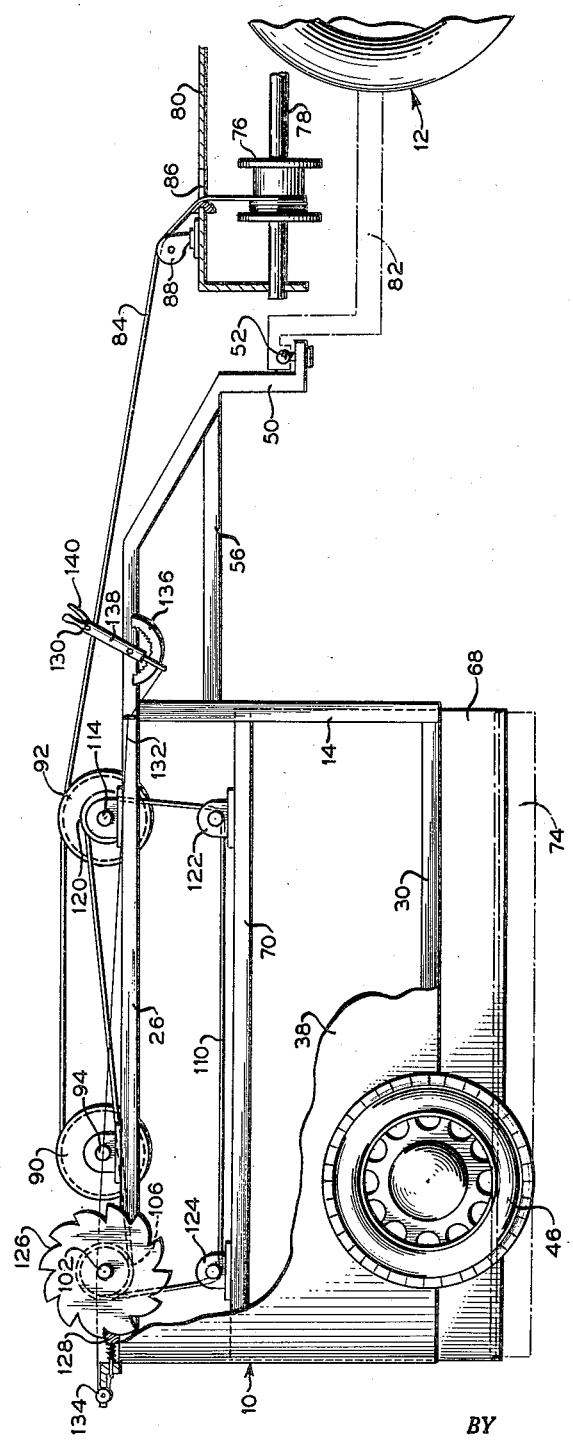

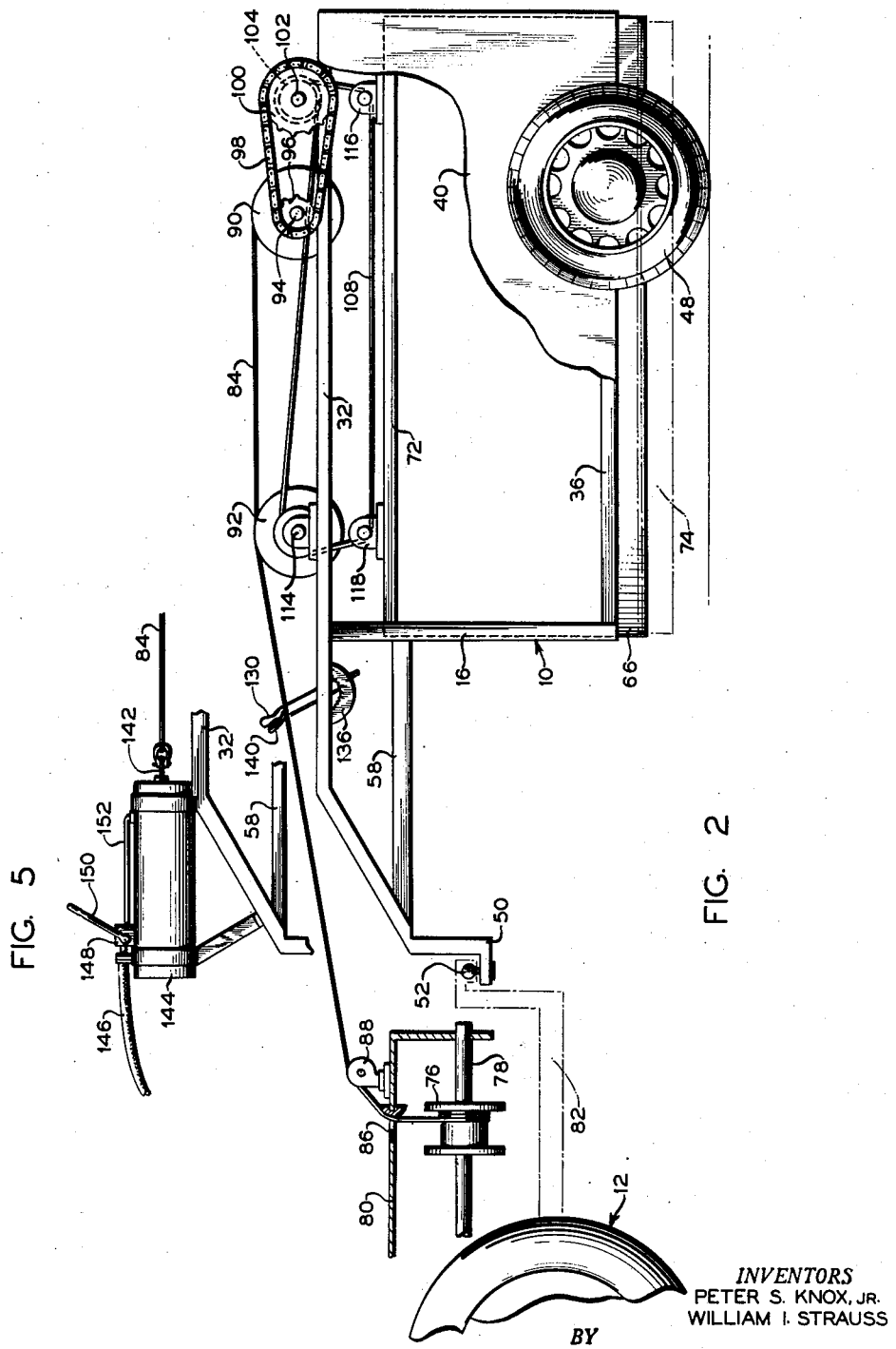

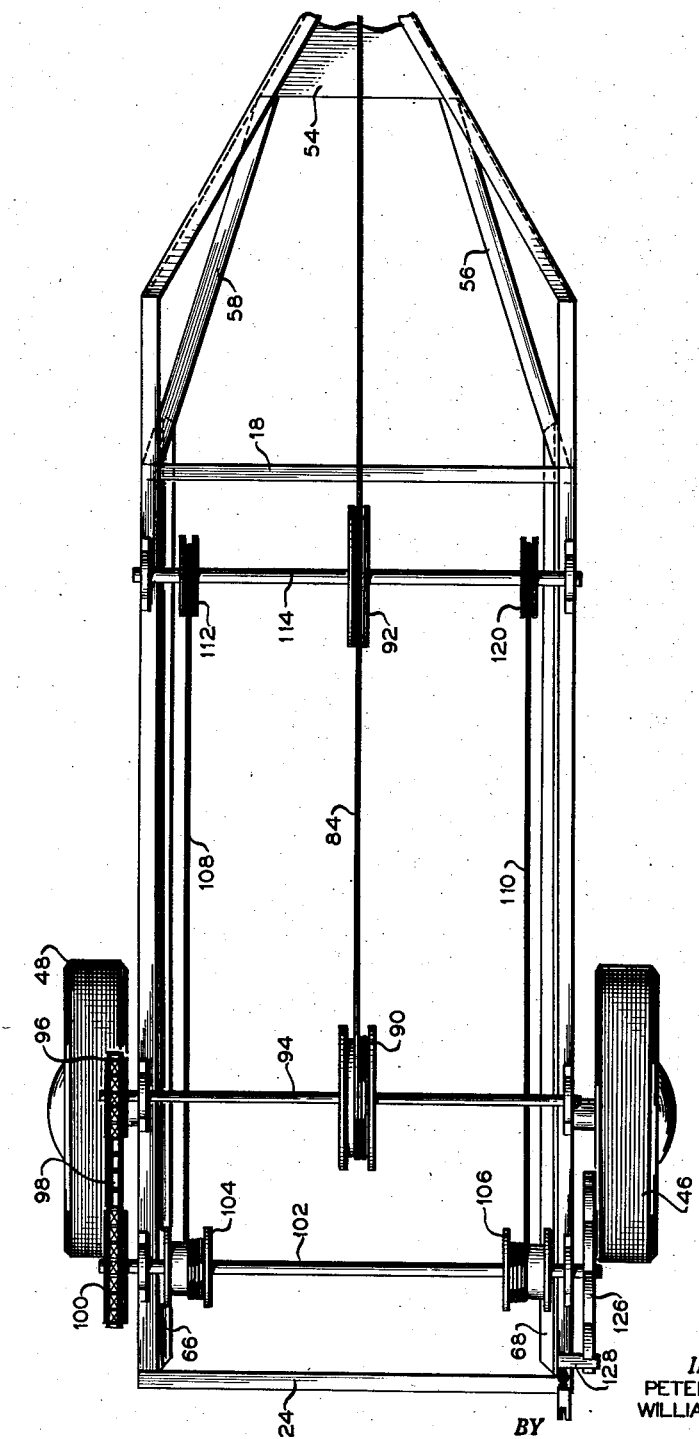

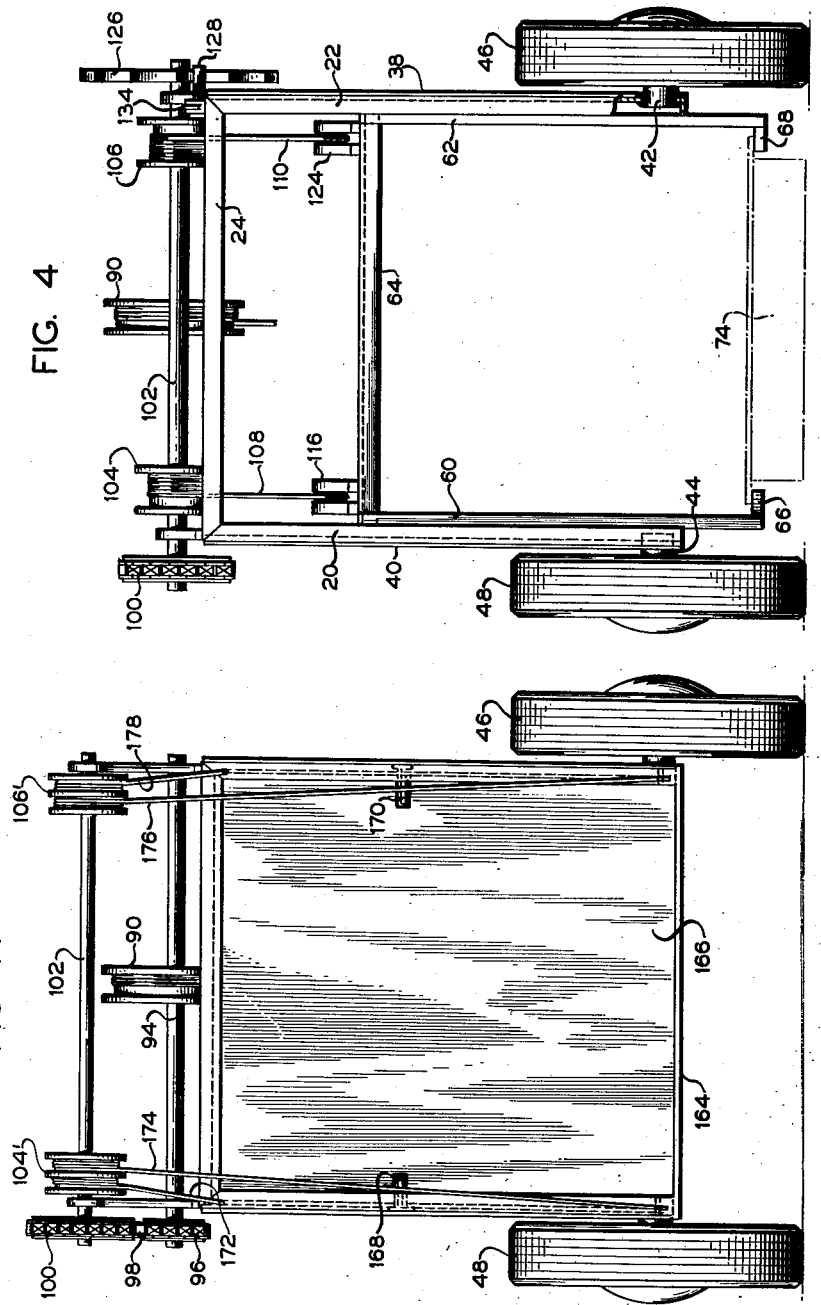

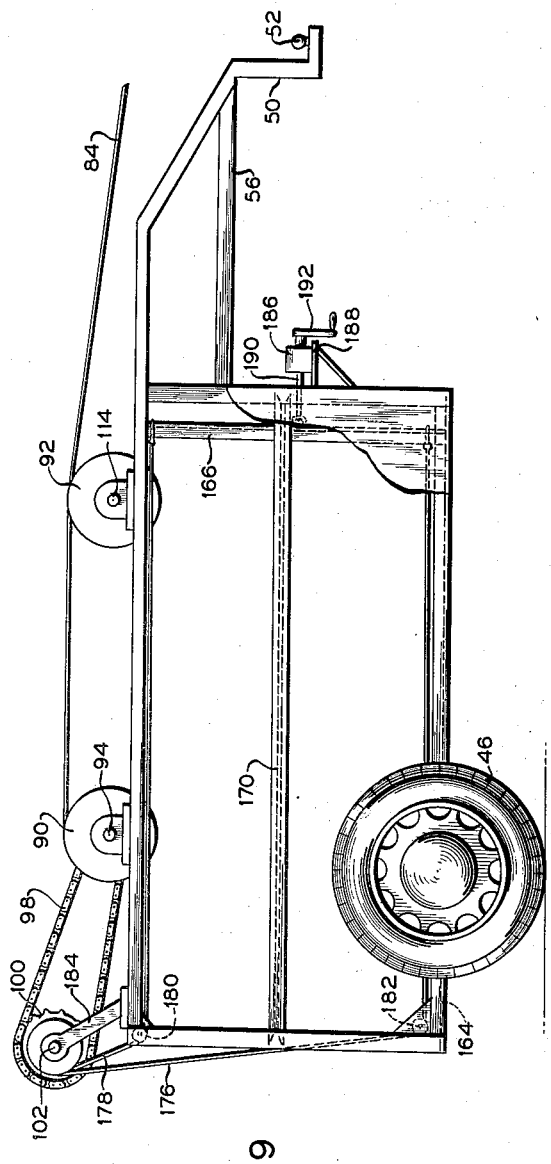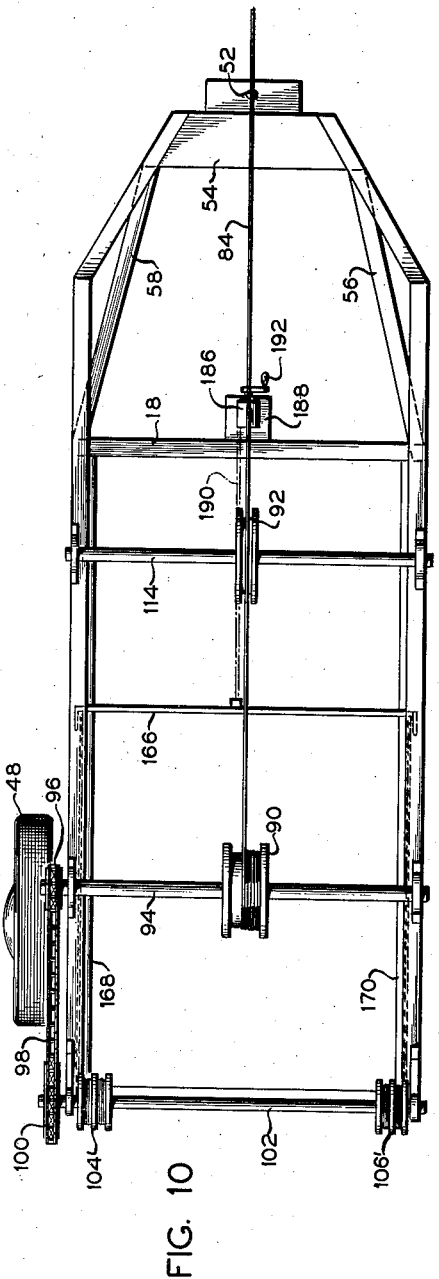

Patented Oct. 30, 1951

2,573,342

UNITED STATES PATENT OFFICE 2,573,342

SELF-LOADING VEHICLE

Peter S. Knox, Jr., and William I. Strauss, Thomson, Ga.

Application February 16, 1946, Serial No. 648,058

12 Claims. (Cl. 214—75)

This invention relates to improvements in self-loading vehicles and particularly to a self-loading vehicle which may be operatively connected with a conventional type tractor for actuation and propulsion by the tractor.

Various types of vehicles for the same general purpose have been previously proposed and have met with various degrees of commercial success. None of them, however, of which we are aware, have successfully solved the particular problems with which the present invention is concerned.

Most of the prior art devices are unitary vehicles in which the source of power and the load lifting and carrying means are all assembled in the same vehicle. This necessitates an expensive vehicle having a limited use. It has been conceived that it is not necessary to limit the use of the entire vehicle in order to accomplish the function of self-loading of relatively heavy loads and transporting such loads.

It is therefore an object of the present invention to provide a self-loading type of vehicle which may be operatively connected with a general purpose vehicle for a specific type of work and which may be uncoupled therefrom when it is desired to use the general purpose vehicle for other work.

A further object resides in the provision of a self-loading type of vehicle which may be releasably coupled to a general purpose vehicle and which has self-loading mechanism which may be conveniently connected with and operated by the general purpose vehicle.

A still further object resides in the provision of a trailer type self-loading vehicle which is simple and economical to manufacture and which is convenient to operate.

An additional object resides in the provision of a trailer type of self-loading vehicle which is capable of lifting heavy loads by the use of a relatively small amount of power and which will safely maintain its load in an elevated position for transportation.

Other objects and advantages will become apparent as the description proceeds in connection with the accompanying drawings, in which, Fig. 1 is a side elevation view of the improved self-loading vehicle and a fragmentary portion of a general purpose tractor to which the self-loading vehicle is operatively connected;

Fig. 2 is a side elevational view similar to Fig. 1 but showing the opposite side of the vehicle from that illustrated in Fig. 1;

Fig. 3 is a top plan view of the improved self-loading vehicle;

Fig. 4 is an end view of the vehicle;

Fig. 5 is a fragmentary elevation view showing a modified mechanism for applying load lifting power to the self-loading vehicle;

Fig. 6 is a side elevational view of a modified form of vehicle, the side panel being broken away to better illustrate the construction thereof;

Fig. 7 is an end view of a suitable support or skid for receiving a load of heavy objects such as logs, stones, etc.;

Fig. 8 is a fragmentary sectional view on the line 8—8 of Fig. 7 showing a cable connecting hook on the skid;

Fig. 9 is a side elevational view of a further modified form of vehicle;

Fig. 10 is a top plan view of the vehicle illustrated in Fig. 9; and

Fig. 11 is an end elevational view of the vehicle shown in Fig. 9.

With continued reference to the drawings, and particularly to Figs. 1 and 2, the self-loading trailer type unit is generally indicated at 10 and the general purpose tractor unit is generally indicated at 12.

The vehicle unit 10 comprises a frame preferably formed of comparatively heavy structural iron members such as angle iron or channel irons and comprises a front end frame having two vertical members 14 and 16, and a transverse upper member 18 (Fig. 3). There is a similar rear frame comprising the vertical side members 20 and 22 and transverse upper member 24, as particularly shown in Fig. 4. The two end frame members are rigidly secured together by vertically spaced longitudinal frame members indicated at 26 and 30 for the side of the vehicle shown in Fig. 1, and 32 and 36 for the side of the vehicle shown in Fig. 2.

These frame members, when united together in the manner illustrated constitute a rectangular box-like construction having open ends and an open bottom. The sides of this construction are covered and reinforced by suitable panel plates as indicated at 38 and 40 welded or otherwise suitably secured to the frame members with which they are in contact.

A stub axle 42 is secured to the longitudinal frame member 30 and a similar axle 44 is secured to frame member 36. Preferably these axles have reduced end portions which extend through suitable apertures in the corresponding frame members which reduced portions may be threaded to receive screw threaded nuts or may be riveted, as may be convenient or desirable, and the stub axles are preferably further secured to the frame members by welding to provide a rigid durable connection between the stub axle and the corresponding frame members. The stub axles 42 and 44 carry respective conventional wheels 46 and 48 and upon which the load carrying vehicle 10 is supported.

The upper longitudinal frame members 26 and 32 are extended forwardly and slanted downwardly and inwardly toward each other, as is particularly shown in Figs. 1, 2 and 3, to provide a narrow front end portion 50 to which a hitch saddle 52 is attached. The forward portions of these side members are preferably reinforced by a suitable gusset plate 54 and additional reinforcement may be provided by extending strut members 56 and 58 from the transverse frame member 18 to the gusset plate 54.

Within the vehicle frame there is disposed a second or auxiliary box-like frame construction having open ends and bottom and comprising two end frames connected together by suitable longitudinal frame members. One of the end frames is shown in Fig. 4 and comprises the vertical members 60 and 62 and the upper transverse member 64. The front end of the auxiliary frame is similar to that shown in Fig. 4 but has not been illustrated.

The two ends of the auxiliary frame are connected together by suitable bottom longitudinal frame members as indicated at 66 and 68, and the upper longitudinal members as indicated at 70 and 72. The auxiliary frame is disposed within the main vehicle frame and is vertically movable relative thereto.

The lower frame members 66 and 68 are in the form of angle irons having inwardly projecting flanges adapted to engage under the corresponding edges of a platform member 74 upon which a load may be stacked.

With this arrangement the trailer type self-loading unit may be moved over a load, such as a stack of brick or lumber, piled on the platform 74 until the inwardly directed flanges of frame members 66 and 68 are in position to engage the corresponding edges of the platform and the auxiliary frame may then be raised relative to the vehicle frame to lift the platform and the load above the ground with the vehicle straddling the load. With the load so elevated it may be transported as may be desired.

The invention provides convenient and effective means for raising the load by means of power derived from the general purpose tractor vehicle generally indicated at 12.

A winch drum 76 is fixed on a drive shaft 78 operatively connected with the power take-off of the vehicle 12 and journaled in suitable bearings, one of which is provided in the cover member 80. The winch drum 76 overlies the tractor bar 82 which extends rearwardly from the tractor vehicle to an operative connection with the hitch saddle 52 provided at the front end of the trailer vehicle 10.

A cable 84 is wound on the drum 76 and passes through a suitable slotted aperture 86 in the cover 80 and over a swiveled sheave 88 to a drum 90 mounted on the trailer vehicle. Additional guide means for the cable is provided by an idler sheave 92 located near the forward end of the trailer vehicle.

With this arrangement the tractor unit 12 may be disposed at various angles relative to the trailer unit 10 while the drum 76 is being operated and the cable will be adequately guided on its supporting sheaves to impart corresponding rotation to the drum 90 as the drum 76 is rotated.

The drum 90 is mounted on an axle 94 in such a manner that rotation of the drum by the cable 84 imparts rotation to the axle 94.

On the end of the axle 94, as illustrated in Fig. 2, there is a sprocket wheel 96 connected by a suitable link chain 98 with a sprocket wheel 100 mounted on an axle 102 which extends transversely of the vehicle 10 at the rearward end thereof.

Axle 102 carries a pair of drums 104 and 106 particularly illustrated in Fig. 3.

A cable 108 is wound upon the drum 104 and a similar cable 110 is wound upon drum 106. The cable 108 passes from the drum 104 over a sheave 112 mounted on shaft 114 which carries guide sheave 92 and passes around two sheaves mounted in brackets 116 and 118 secured to the upper longitudinal member 72 of the auxiliary frame. Similarly cable 110 passes over a sheave 120 on shaft 114 and around sheaves mounted in brackets 122 and 124 secured to the upper surface of the longitudinal upper member 70 of the auxiliary frame. The two cables, 108 and 110, thus constitute variable loops disposed one at each side of the outer frame and operatively connected with the inner frame to raise and lower the inner frame as the size of the loops is varied.

The arrangement is such that when the shaft 102 is rotated by means of the cable 84, shaft 94, sprockets 96 and 100, and chain 98, the cables 108 and 110 will be wound upon the corresponding drums 104 and 106 or will be unwound therefrom. When the cables 108 and 110 are wound upon the corresponding drums the auxiliary frame members 70 and 72 will be subjected to an upwardly directed force which will lift the auxiliary frame relative to the main frame of the vehicle 10. If the auxiliary frame is engaged with a load platform the load will be lifted up into the body of the trailer vehicle for transportation.

In order to maintain the load in the elevated position a ratchet wheel 126 is secured on shaft 102 and is engaged by a spring biased ratchet detent 128 mounted on the upper frame member 26. This ratchet will maintain the load at any elevation to which it is brought by operation of the cable 84 and associated mechanism. When it is desired to release the load the cable 84 is tightened to remove the load from the ratchet wheel and the detent 128 is withdrawn by suitable means such as the hand lever 130 which is connected with the detent by a cord or cable 132 which passes over a sheave 134 mounted at the opposite side of the detent from the lever 130. The lever 130 may be held in position to withdraw or release the detent by suitable means such as the toothed segment or rack 136 engageable by a lever carried detent 138 controlled by handle 140.

In the modified arrangement shown in Fig. 5, the cable 84 is connected to the outer end of a piston rod 142 which is connected to a piston slidable in a cylinder 144 mounted on the forward end of the main frame of the trailer vehicle. A conduit 146 leads from a suitable pump or other source of fluid under pressure mounted on the tractor vehicle 12 to a suitable three way valve 148 operated by a hand lever 150. From the valve a conduit 152 leads into the cylinder 144 at the end thereof adjacent the cable 84.

With this arrangement when fluid under pressure is admitted to the cylinder the piston is forced in a direction to pull on the cable 84 in the same manner as the drum 76 of Fig. 1 pulls on the cable. The cylinder is of sufficient size in consideration of the degree of fluid pressure available to exert a sufficient force on the cable 84 to lift the maximum load for which the vehicle is designed.

The piston may be operated either by hydraulic or pneumatic means. In the case of pneumatic operation, a single conduit 146 leading to the cylinder is sufficient but when hydraulic means are utilized a return conduit should be supplied to return the hydraulic fluid to a suitable reservoir or the intake of the hydraulic pump.

In the modified arrangement shown in Fig. 6, the vehicle outer frame is substantially the same as that illustrated in Figs. 1 and 2 and described in connection therewith. In the modified arrangement, however, the inner frame is omitted and the loops formed by the cables 108 and 110 are divided so that four load lifting cables are provided, two of them being indicated at 149 and 151 in Fig. 6. Two corresponding cables, not illustrated, are provided on the opposite side of the frame. Both cables 149 and 151 are wound on the drum 104 and the corresponding cables are wound on the drum 106 at the opposite side of the frame. The rear cable 151 depends directly downward from the corresponding drum, while the cable 149 is led forwardly and over the sheave 112 mounted on shaft 114 and depends at the side of the vehicle frame or body near the forward end thereof. The arrangement is such that the four cable ends depend from the top of the frame near the four corners thereof, respectively.

A link or hook, as indicated at 153 and 154 in Fig. 6, is secured to the depending end of each cable and is shaped for connection to a load lifting sling or skid. When slings are used they may be of conventional form comprising relatively short lengths of chain or cable with hooks at the ends thereof. These devices have not been illustrated as it is believed that they are well known to those skilled in the art.

A load supporting skid is diagrammatically illustrated in Fig. 7 and may comprise a pair of relatively heavy members 156 and 158 which, in some cases may be connected by cross pieces or a platform 160, although they may be used separately in the place of the slings mentioned above. The cross pieces may have hooks or projections 162 at their ends with which the chain hooks or links 153 and 154 may be engaged to raise a load carried on the skid.

The load raising mechanism may be the same as that shown in Figs. 1 and 2 and described in connection therewith and a further description is not believed to be necessary for the purposes of the present disclosure.

In the form of the invention shown in Figs. 9, 10 and 11, the inner load lifting frame is likewise omitted and a flooring 164 is provided firmly connected at its edges to the lower portion of the outer frame. An end closure member 166 is provided for the front, or right hand end of the vehicle as viewed in Fig. 9, and is arranged to slide lengthwise of the vehicle frame or body to eject a load from the rear or left hand end of the body. This movable closure member is guided in its movements lengthwise of the body by a pair of track members 168 and 170 which may conveniently comprise structural iron members of T or channel section. In Fig. 11 the members are illustrated as of T-shape cross section and the closure member is provided in the sides thereof with notches which slidably receive the webs of these members.

A slightly modified form of the load lifting mechanism previously described may be utilized to draw the closure member rearwardly to eject a load from the vehicle. In this arrangement four cables 172, 174, 176 and 178 are wound upon drums 104' and 106' secured on the shaft 102 journalled on the top of the vehicle frame at the rearward end thereof. The drums 104' and 106' have been illustrated as double drums providing a separate compartment for each cable to avoid interference of the cables as they are wound onto and off of the drums. The two upper cables 172 and 178 are led over suitable guide sheaves connected to the frame, the sheave for cable 178 being indicated at 180 in Fig. 9. The guide sheave for the corresponding lower cable 176 is indicated at 182. From the sheaves 180 and 182 the corresponding cables 178 and 176 extend forwardly lengthwise of the vehicle and are attached respectively to the upper and lower corners of the closure member 166 at the corresponding side of the vehicle. The cables 172 and 174 on the opposite side of the vehicle are led over corresponding sheaves and are similarly attached to the corresponding corners of the closure member.

In order to provide sufficient clearance for the cables at the rear of the vehicle frame the shaft 102 has been raised somewhat above the top of the frame and moved rearwardly being rotatably supported in this position by a suitable bracket 184 secured on the top of the frame at the rearward end thereof. As it is not necessary to lock the cable winding mechanism in any of its operative positions, the ratchet wheel 126 and detent 128 are omitted. Otherwise, the cable winding mechanism is similar to that shown in Figs. 1 and 2 and described in connection therewith and a further description is not believed to be necessary for the purposes of the present disclosure.

Suitable means are provided to return the end closure member to its position at the forward end of the vehicle body after it has been moved to eject a load from the body. This return mechanism may conveniently comprise a manually rotated drum 186 mounted on a bracket 188 on the forward end of the vehicle and connected by a suitable cable or by suitable cables, as indicated at 190, with the closure member 166. The cable or cables will be led over suitable guide sheaves or through fairleads so that rotation of the drum 186 will exert a direct pull on the member 166 to return it to its position at the forward end of the vehicle. The closure member is stopped in its limiting forward condition by suitable stop members such as inwardly directed flanges on the front frame members. The drum 186 may be rotated by a suitable manual crank 192 and if desired a reduction gear train may be incorporated between this crank and the cable winding drum.

The above described arrangement provides an accessary or auxiliary vehicle which may be quickly and easily connected with a general purpose vehicle to lift and carry heavy loads when such service is desired and may at other times be detached from the general purpose vehicle which may then be used for other purposes.

It will be obvious to those skilled in the art that various changes may be made in the invention without departing from the spirit and scope thereof and therefore the invention is not limited by that which is shown in the drawings and de-

What is claimed is:

1. A trailer type self-loading vehicle comprising a wheel supported outer frame having at one end a tapered extension terminating in a hitch connection for attachment to a tractor vehicle; an inner frame within said outer frame movable in a vertical direction relative thereto; means on the lower portion of said inner frame operative to lift a load when said inner frame is raised relative to said outer frame; and means for raising and lowering said inner frame and retaining it in elevated position comprising an axle mounted transversely on the top of said outer frame; a drum and a sprocket wheel secured on said axle against relative rotation; a cable wound on said drum; means operable by power derived from an associated tractor vehicle operative to exert a force on said cable to rotate said drum, axle and sprocket wheel; a second axle journalled on said outer frame; a pair of drums and a sprocket wheel secured on said second axle; a drive chain connecting said sprocket wheels; a transverse shaft mounted on said outer frame; a plurality of sheaves on said shaft one of which constitutes a guide for said cable; a pair of cables wound one on each drum on said second axle and passing over respective sheaves on said transverse shaft to provide variable loops, one at each side of said outer frame; and sheaves connecting said inner frame with said loops whereby said inner frame will be raised relative to said outer frame when said loops are decreased.

2. A trailer type self-loading vehicle comprising a wheel supported outer frame having open ends and bottom and a hitch member at one end thereof; an inner frame vertically movable relative to said outer frame and provided with load engaging means at the lower portion thereof; means for raising said inner frame relative to said outer frame comprising a pair of drums journalled on said outer frame; a pair of sheaves journalled on said outer frame; cable loops wound on said drums and passing over corresponding sheaves; sheaves connecting said inner frame with said cable loops; means on said outer frame operative to rotate said drums to vary said cable loops; and means deriving power from outside said vehicle operatively associated with said drum rotating means to drive the same.

3. A trailer type self loading vehicle comprising a frame; stub axles secured to the sides of said frame; frame supporting wheels on said stub axles; a first transverse axle journalled on the top of said frame; two double drums secured one on each end portion of said first axle; a chain sprocket and a ratchet wheel also secured on said first axle; a second transverse axle also journalled on the top of said frame; a drum and a chain sprocket secured on said second axle; means deriving power from outside said vehicle and including a cable wound on said second axle drum for rotating said second axle; a chain drivingly connecting said first and second axles; four cables wound one on each portion of said double drums with two cable ends depending near one end of said frame; cable guide sheaves at the opposite end of said frame, two of said four cables being led over said guide sheaves and having their ends depending at said opposite end of said frame; and means on said cable ends for attachment to load lifting slings or skids.

4. A trailer type vehicle comprising a generally rectangular frame; stub axles secured to the sides of said frame exteriorly of said frame; frame supporting wheels on said stub axles providing unobstructed end and bottom openings in said frame; and load lifting means associated with said frame comprising cable winding drums journalled on the top of said frame; four cables wound on respective drum portions and depending from the top of said frame adjacent the four corners thereof; cable guide sheaves on said frame; load attaching means on the ends of said cables; and power operated means deriving its operating power from outside said vehicle mounted on the top of said frame and drivingly connected with said drum.

5. A trailer type vehicle comprising a generally rectangular frame; stub axles secured to the sides of said frame exteriorly thereof; frame supporting wheels on said stub axles; and load moving means associated with said frame comprising drums journalled on the top of said frame; cables wound on said drums and having load moving means connected therewith; cable guide sheaves on said frame; and power operated drum driving means mounted on said frame and deriving its operating power from a source outside of said vehicle, said drum driving means comprising a second drum journalled on said frame and drivingly connected with said first mentioned drums; a cable wound on said second drum; and cable winding means outside of said vehicle operatively connected with said second drum cable to rotate said second drum.

6. A trailer type vehicle comprising a generally rectangular frame; stub axles secured to the sides of said frame exteriorly thereof; frame supporting wheels on said stub axles; and load moving means associated with said frame comprising drums journalled on the top of said frame; cables wound on said drums and having load moving means connected therewith; cable guide sheaves on said frame; and power operated drum driving means mounted on said frame and deriving its operating power from a source outside of said vehicle, said drum driving means comprising a second drum journalled on said frame and drivingly connected with said first mentioned drums; a cable wound on said second drum; cable winding means outside of said vehicle operatively connected with said second drum cable to rotate said second drum; and a cable guide sheave for said second drum cable journalled on said frame at a location spaced from said second drum.

7. A self loading vehicle comprising a wheel supported outer frame having open ends and bottom for receiving a load therein, an axle rotatably mounted transversely of, at the top of, and at one end of said frame; drums fixedly mounted on each end of said first axle, load carrying cables each having at least one end fixed to said drums adapted to be wound thereon; some cables hanging downwardly directly from said drums, sheaves mounted at the top of the other end of said frame each having one of said cables passing thereover and extending downwardly therefrom, means supported from said cables to support a load whereby on winding of said cables on said drums said load will be lifted, and means operable by a straight pull exerted in a direction from said one end of said frame toward the other end to cause rotation of said drums.

8. A self loading vehicle comprising a wheel supported outer frame having open ends and bottom for receiving a load therein, an axle rotatably mounted transversely of, at the top of, and at one end of said frame, drums fixedly mounted on each end of said first axle, load carrying cables each having at least one end fixed to said drums adapted to be wound thereon, some cables hanging downwardly directly from said drums, sheaves mounted at the top of the other end of said frame each having one of said cables passing thereover and extending downwardly therefrom, means supported from said cables to support a load whereby on winding of said cables on said drums said load will be lifted, a second axle rotatably mounted on said frame in spaced parallel relation to said first named axle, positive driving connection between said axles whereby they rotate together, and a driving drum fixedly mounted centrally of said second axle to rotate therewith, a driving cable wound on said driving drum whereby when said cable is unwound from said driving drum said first mentioned cables wind up on said drums on said first named axle.

9. A self loading vehicle comprising a wheel supported outer frame having open ends and bottom for receiving a load therein, an axle rotatably mounted transversely of, at the top of, and at one end of said frame, drums fixedly mounted on each end of said first axle, load carrying cables each having at least one end fixed to said drums adapted to be wound thereon, some cables hanging downwardly directly from said drums, sheaves mounted at the top of the other end of said frame each having one of said cables passing thereover and extending downwardly therefrom, means supported from said cables to support a load whereby on winding of said cables on said drums said load will be lifted, a second axle rotatably mounted on said frame in spaced parallel relation to said first named axle, positive driving connection between said axles whereby they rotate together, and a driving drum fixedly mounted centrally of said second axle to rotate therewith, a driving cable wound on said driving drum whereby when said cable is unwound from said drum said first mentioned cables wind up on said drums on said first named axle, a cylinder mounted on said frame adjacent the other end thereof, a piston and piston rod slidable in said cylinder and connected to said driving cable, and valve means controlling the fluid under pressure into and out of said cylinder thereby pulling said driving cable for raising a load or releasing the pull for lowering a load.

10. A self loading vehicle comprising a tractor unit and a trailer unit coupled together by a swivel connection; said trailer unit having an outer wheel supported frame, an inner load engaging frame, and means supported on said outer frame and connected with said inner frame for raising and lowering said inner frame; said tractor unit having a power take off device; and transmission means operatively connected between said power take off device and said inner frame raising and lowering means for raising said inner frame by power derived from said tractor unit, said transmission means comprising a drum mounted on said trailer unit and drivingly connected with said frame raising and lowering means; a drum mounted on said tractor unit and operatively connected with said power take off device; and a cable having one end wound upon one of said drums and the other end wound upon the other of said drums, and guide sheaves mounted on said vehicle between said drums supporting and guiding said cable.

11. A self loading vehicle comprising a tractor unit and a trailer unit coupled together by a swivel connection; said trailer unit having an outer wheel supported frame, an inner load engaging frame, and means supported on said outer frame and connected with said inner frame for raising and lowering said inner frame; said tractor unit having a power take off device; and transmission means operatively connected between said power take off device and said inner frame raising and lowering means for raising said inner frame by power derived from said tractor unit, said transmission means comprising a drum mounted on said trailer unit and drivingly connected with said frame raising and lowering means; a cable having one end portion wound on said drum; an expansible chamber device mounted on said trailer unit and operatively connected with the other end of said cable; conduit means leading from a source of fluid under pressure on said tractor unit to said expansible chamber device; and a manually controllable valve in said conduit means.

12. A self loading vehicle comprising a tractor unit and a trailer unit coupled together by a swivel connection; said trailer unit having an outer wheel supported frame, an inner load engaging frame, and means supported on said outer frame and connected with said inner frame for raising and lowering said inner frame; said tractor unit having a power take off device; and transmission means operatively connected between said power take off device and said inner frame raising and lowering means for raising said inner frame by power derived from said tractor unit, said transmission means comprising a drum mounted on said trailer unit and drivingly connected with said frame raising and lowering means; a drum mounted on said tractor unit and operatively connected with said power take off device; and a cable having one end wound upon one of said drums and the other end wound upon the other of said drums.

PETER S. KNOX, Jr.
WILLIAM I. STRAUSS.

REFERENCES CITED

The following references are of record in the file of this patent:

UNITED STATES PATENTS

| Number | Name | Date |
|---|---|---|
| 717,951 | Tyler | Jan. 6, 1903 |
| 964,364 | Arnold | July 12, 1910 |
| 1,044,955 | Walther | Nov. 19, 1912 |
| 1,180,206 | Takacs | Apr. 18, 1916 |
| 1,609,625 | Lawes | Dec. 7, 1926 |
| 1,769,939 | Berasi | July 8, 1930 |
| 2,069,697 | Dempster | Feb. 2, 1937 |
| 2,092,921 | Kalmon | Sept. 14, 1937 |
| 2,240,564 | Le Tourneau | May 6, 1941 |
| 2,261,509 | Williams | Nov. 4, 1941 |
| 2,266,866 | Houston | Dec. 23, 1941 |
| 2,276,127 | Wahl | Mar. 10, 1942 |
| 2,299,971 | Foshee | Oct. 27, 1942 |
| 2,305,630 | McNeil | Dec. 22, 1942 |
| 2,321,198 | Graves | June 8, 1943 |
| 2,404,898 | Aycock | July 30, 1946 |